(12) United States Patent
Engesser et al.

(10) Patent No.: US 7,517,153 B2
(45) Date of Patent: Apr. 14, 2009

(54) FLUID DYNAMIC BEARING SYSTEM

(75) Inventors: Martin Engesser, Donaueschingen (DE); Stefan Schwamberger, Lohsa Ot. Hermsdorf (DE)

(73) Assignee: Minebea Co., Ltd., Nagano-ken (JP)

( * ) Notice: Subject to any disclaimer, the term of this patent is extended or adjusted under 35 U.S.C. 154(b) by 409 days.

(21) Appl. No.: 11/413,554

(22) Filed: Apr. 28, 2006

(65) Prior Publication Data

US 2006/0250040 A1    Nov. 9, 2006

(30) Foreign Application Priority Data

May 6, 2005    (DE)    ........................ 10 2005 021 123

(51) Int. Cl.
*F16C 17/10*    (2006.01)
(52) U.S. Cl. ...................... 384/107; 384/111
(58) Field of Classification Search .................. 310/90; 384/107, 111–113
See application file for complete search history.

(56) References Cited

U.S. PATENT DOCUMENTS

| | | | | | |
|---|---|---|---|---|---|
| 5,558,445 | A | * | 9/1996 | Chen et al. .................. | 384/132 |
| 5,876,124 | A | * | 3/1999 | Zang et al. .................. | 384/107 |
| 6,126,320 | A | * | 10/2000 | Ichiyama ..................... | 384/112 |
| 6,447,167 | B1 | * | 9/2002 | Kashiwada et al. ......... | 384/100 |
| 7,284,910 | B2 | * | 10/2007 | Dittmer et al. .............. | 384/132 |
| 7,413,347 | B2 | * | 8/2008 | Engesser et al. ............ | 384/107 |
| 7,413,348 | B2 | * | 8/2008 | Schwamberger et al. .... | 384/107 |

* cited by examiner

*Primary Examiner*—Burton Mullins
(74) *Attorney, Agent, or Firm*—Cooper & Dunham, LLP

(57) ABSTRACT

The invention relates to a fluid dynamic bearing system that has a stationary sleeve, a stationary shaft disposed in the sleeve and bearing disks disposed on the sleeve and shaft which form an annular disk-shaped space between each other in which an annular disk-shaped component is disposed. A bearing gap filled with a bearing fluid is formed between the stationary and the rotating bearing construction. The bearing system further comprises at least one radial bearing formed between the outer circumference of the shaft and the inner circumference of the annular disk-shaped component, at least two axial bearings formed by the two end faces of the annular disk-shaped component and the first end faces of the bearing disks opposing these; and capillary seals to seal the two open ends of the bearing gap, at least one capillary seal comprising a reservoir that is at least partly filled with bearing fluid and is formed between the surfaces opposing each other of the rotor hub, or a component connected to the rotor hub, and an end face of one of the bearing disks.

12 Claims, 8 Drawing Sheets

FLUID DYNAMIC BEARING SYSTEM

BACKGROUND OF THE INVENTION

The invention relates to a fluid dynamic bearing system particularly for the rotary support of a spindle motor to drive hard disk drives.

PRIOR ART

The-ongoing miniaturization of hard disk drives is giving rise to new problems in their design and construction, particularly with regard to the manufacture of small drive motors and suitable bearing systems. Although roller bearing systems have mainly been used to date, fluid dynamic bearing systems are becoming increasingly popular due to their small-scale construction and higher precision.

It is known to provide the existing bearing systems with two radial bearings. In order to achieve the required bearing stiffness, the radial bearings have to be disposed at a sufficient axial spacing with respect to one another. However, conventional solutions in the design of fluid dynamic hard disk drive bearings and methods for their manufacture are either impossible to apply or can only be applied with difficulty in the design and construction of miniature spindle motors. The smaller the bearing systems become, the lower are their load-bearing capacity and stiffness when conventional construction methods are used.

In place of two radial bearings spaced apart from one another, it is known to provide at least two axial bearings which provide the necessary radial and axial stiffness. Bearing systems having this kind of construction can be made very flat and are thus highly suitable for use in small-scale, flat spindle motors.

It is known to use capillary seals to seal the bearing gap. Relevant embodiments are proposed in DE 202 11 588 U1 and U.S. Pat. No. 5,667,309 A. However, in the case of the capillary seal suggested in the latter document, the effective useful bearing length is reduced by the tapered reservoir of the capillary seal being designed to extend axially. What is more, if this kind of bearing is employed in a hard disk drive, the proximity of the upper reservoir to the storage disks means that there is a risk of the disks becoming contaminated by bearing fluid.

SUBJECT MATTER OF THE INVENTION

The object of the invention is to create a hydrodynamic bearing particularly for use in spindle motors that, given a low overall height, shows high bearing stiffness and has a simple construction.

The fluid dynamic bearing system according to the invention comprises a stationary bearing construction having a sleeve disposed in a base and a first bearing disk disposed at one end of the sleeve, a shaft firmly fixed at one end in the sleeve and a second bearing disk disposed at the other end of the shaft, the second bearing disk being disposed on the shaft at a spacing to the first bearing disk such that an annular space is formed between the two bearing disks. A bearing construction rotating about a rotational axis is provided having an annular disk-shaped component that is disposed in the annular disk-shaped space formed by the stationary bearing construction, and a rotor hub disposed at the outer circumference of the annular disk-shaped component, as well as a bearing gap filled with a bearing fluid and formed by the bearing surfaces opposing each other of the stationary and the rotating bearing construction. The bearing system further comprises at least one radial bearing formed between the outer circumference of the shaft and the inner circumference of the annular disk-shaped component, at least two axial bearings formed by the two end faces of the annular disk-shaped component and the first end faces of the bearing disks opposing these; and capillary seals to seal the two open ends of the bearing gap, at least one capillary seal comprising a reservoir that is at least partly filled with bearing fluid and is formed between the surfaces opposing each other of the rotor hub, or a component connected to the rotor hub, and an end face of one of the bearing disks.

In a first embodiment of the invention, a first capillary seal is provided that has an annular reservoir perpendicular to the rotational axis which is formed between a slanted inner end face of the rotor hub and the end face of the second bearing disk such that the reservoir tapers radially outwards narrowing in the direction of the bearing gap.

According to a modified embodiment of the invention provision can be made for the reservoir of the first capillary seal to be formed between a slanted inner end face of a rotationally symmetric component connected to the rotor hub and an end face of the second bearing disk such that the reservoir tapers radially outwards narrowing in the direction of the bearing gap. The rotationally symmetric component is preferably designed as a turned or deep-drawn part.

According to another embodiment of the invention provision can be made that in addition to the first capillary seal, a second capillary seal is provided that has an annular reservoir perpendicular to the rotational axis which is formed between a slanted inner end face of a rotationally symmetric component connected to the rotor hub and an end face of the first bearing disk such that the reservoir tapers radially outwards narrowing in the direction of the bearing gap. This rotationally symmetric component can also be designed as a turned or as a deep-drawn part. The use of deep-drawn parts is a cost-effective alternative to using turned parts.

The bearing system advantageously comprises a sleeve comprising a first bearing disk and a second bearing disk, both accommodating an annular disk-shaped component in-between. Due to the flat, disk-shaped design of the components, that is first bearing disk, second bearing disk and the disk-shaped component, the overall axial height of the bearing system can be kept considerably small.

The design and construction of the bearing system, in particular the first bearing disk and the sleeve, as well as the second bearing disk and the shaft, provide annular recesses at the outer circumference of the sleeve and shaft, respectively, which are used to accommodate the upper and lower capillary seals and the fluid reservoirs.

Thus it is possible to arrange the upper and/or the lower reservoir of the capillary seals horizontally in an advantageous way without further affecting the overall axial height of the bearing system. Only a few components are needed for this purpose. These components are preferably designed as turned parts but may also be designed as deep-drawn metal sheets. The capillary seals are designed as conical seals known as taper seals. When the motor is in operation, the sealing action is supported by centrifugal forces acting on the bearing fluid.

By integrating the function of the components, the bearing system consists of only a few components. These components can be made using conventional manufacturing processes. Since the required tilt resistance is not achieved by means of radial bearings having a large axial spacing, but rather primarily through the axial bearings, the required overall height can be kept low. This makes for high axial stiffness. The radial stiffness that is still necessary is provided by the radial bearing.

The fluid dynamic bearing system described above can be advantageously employed for the rotary support of a spindle motor to drive a hard disk drive.

The invention is described in more detail below on the basis of several embodiments with reference to the drawings. Further characteristics, advantages and possible applications of the invention can be derived from the drawings and their description.

BRIEF DESCRIPTION OF THE DRAWINGS

The drawings show.

DESCRIPTION OF PREFERRED EMBODIMENTS OF THE INVENTION

Figure 1:
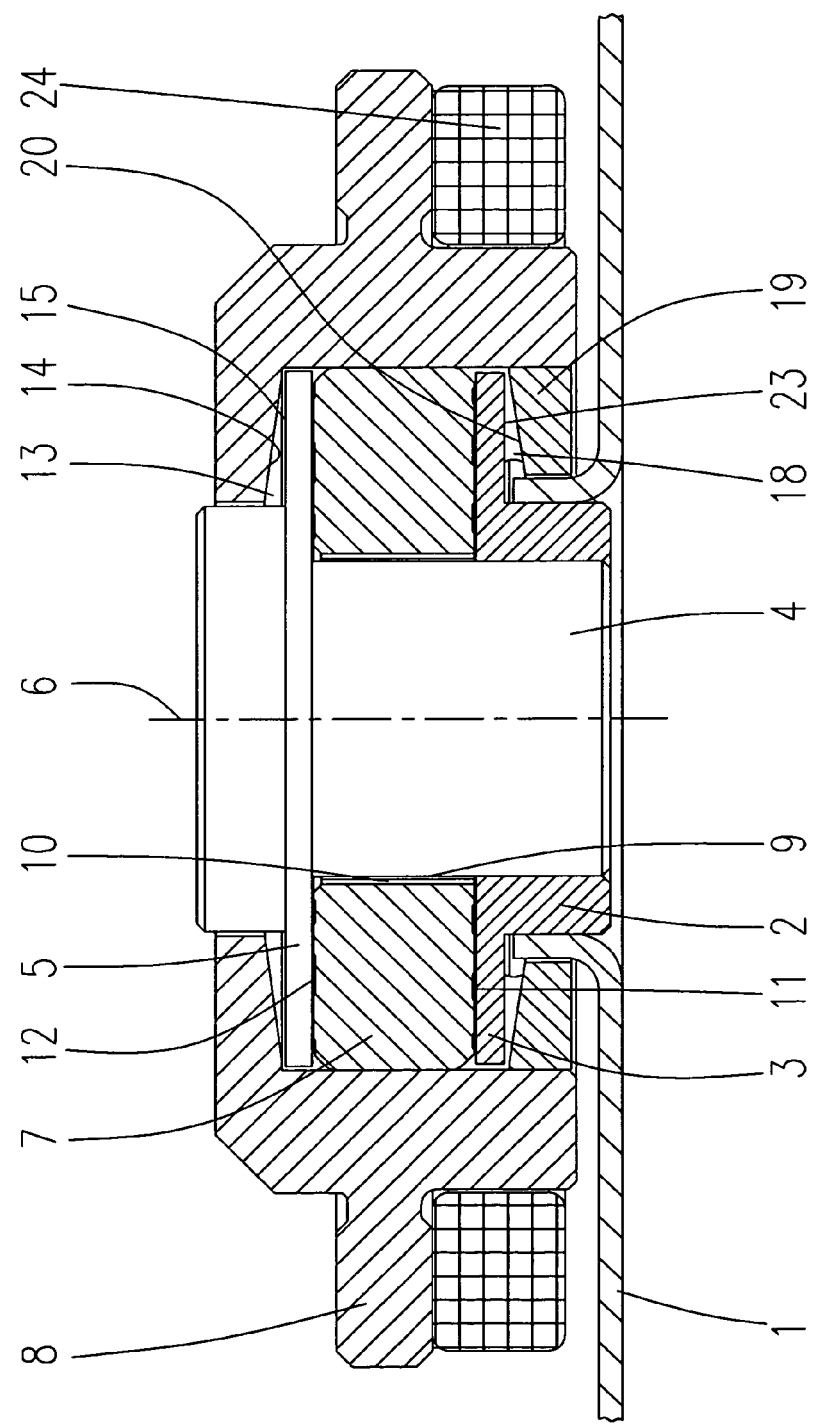
FIG. 1: a section through a first embodiment of a bearing system according to the invention.

FIG. 1 shows the basic construction of a fluid dynamic bearing system according to the invention for spindle motors. The bearing system is characterized by its simple design and construction.

The stationary bearing construction comprises a base 1 that can take the form, for example, of a deep-drawn flange. A sleeve 2 is fixed in an opening in the base, a first bearing disk 3 extending radially outwards from one side of the sleeve. One end of a shaft 4 is firmly fixed in the sleeve 2. A second bearing disk 5 is disposed at the other end of the shaft 4 at a distance to the first bearing disk 3 such that an annular disk-shaped space is formed between the two bearing disks 3, 5. The bearing disk 5 may be formed as an integral part of the shaft 4 or as a separate component.

The bearing construction rotating about a rotational axis 6 comprises an annular disk-shaped component 7 that is accommodated in the annular disk-shaped space formed by the stationary bearing construction. A rotor hub 8 is disposed at the outer circumference of the annular disk-shaped component 7, the rotor hub 8 carrying the rotor magnets (24) as well as the magnetic storage disks and other components of the spindle motor and of the hard disk drive (not illustrated).

The bearing surfaces opposing each other of the stationary bearing construction and of the rotating bearing construction are spaced apart from each other by a bearing gap 9 filled with a bearing fluid, such as bearing oil or even air. The bearing gap 9 extends along the surfaces of the component 7 that are defined by the bearing disks 3, 5 and the shaft 4 and ends at the outer edges of the two bearing disks 3 or 5 respectively.

The fluid dynamic bearing system comprises a radial bearing 10 that is formed between the outer circumference of the shaft 4 and the inner circumference of the annular disk-shaped component 7. The radial bearing 10 is defined in a conventional way by surface patterns (not illustrated), taking the form, for example, of a grooved pattern and being provided on the surfaces of the shaft 4 and/or of the annular disk-shaped component 7. The surface patterns are designed in such a way that when the shaft 4 is in rotation they exert a pumping action on the bearing fluid directed to the center of the radial bearing.

The bearing system further comprises two axial bearings 11, 12 that are formed by the two end faces of the annular disk-shaped component 7 and the inner end faces opposing these surfaces of the two bearing disks 3 or 5. Each of the axial bearings 11 or 12 is also defined by surface patterns (not illustrated) that are disposed on the surfaces of the annular disk-shaped component 7 and/or the bearing disks 3, 5. These surface patterns may be spiral-shaped in form so that when the annular disk-shaped component 7 rotates with respect to the two bearing disks 3, 5 they exert a hydrodynamic pumping action on the bearing fluid that is mainly directed radially inwards in the direction of the radial bearing 10. Together with the radial bearing 10, the axial bearings 11 or 12 having relatively larger bearing surfaces compared to the radial bearing act (pump) towards the interior of the bearing and provide high axial and radial stiffness thus improving the tilt resistance of the bearing.

Sealing the two openings of the bearing gap 9 with respect to the environment is achieved by means of capillary seals in which the material-specific properties of the bearing fluid and the active principles of the capillary, adhesive and cohesive forces are exploited. The capillary seals involved here are horizontal capillary seals, i.e. they extend radially.

A first capillary seal is provided in the region of the second bearing disk 5. The seal comprises an annular reservoir 13 extending substantially perpendicular to the rotational axis 6 that is at least partly filled with bearing fluid and connected to the bearing gap 9. The reservoir is located between a slanted inner end face 14 of the rotor hub and the end face 15 of the second bearing disk 5 and is so formed that it tapers radially outwards narrowing in the direction of the bearing gap 9. The bearing fluid is accordingly located in an annular hollow space tapering radially outwards between the rotor hub 8 and the bearing disk 5.

In addition to the prevailing capillary action between the bearing fluid and the sealing faces enclosing the space, due to centrifugal forces the bearing fluid is pressed by a rotational movement of the rotor hub 8 radially outwards, i.e. into the bearing gap 9.

A second capillary seal is provided in the region of the first bearing disk 3. The seal comprises an annular reservoir 18 extending substantially perpendicular to the rotational axis 6 that is connected to the bearing gap 9 and at least partly filled with bearing fluid. The reservoir is located between a slanted inner end face 20 of a rotationally symmetric component 19 connected to the rotor hub and the end face 23 of the first bearing disk 3 and is so formed that it tapers radially outwards narrowing in the direction of the bearing gap 9. In the illustrated embodiment, the component 19 takes the form of an annular turned part that is fixed to the lower inside edge of the rotor hub 8, by means, for example, of welding or bonding.

Figure 2:
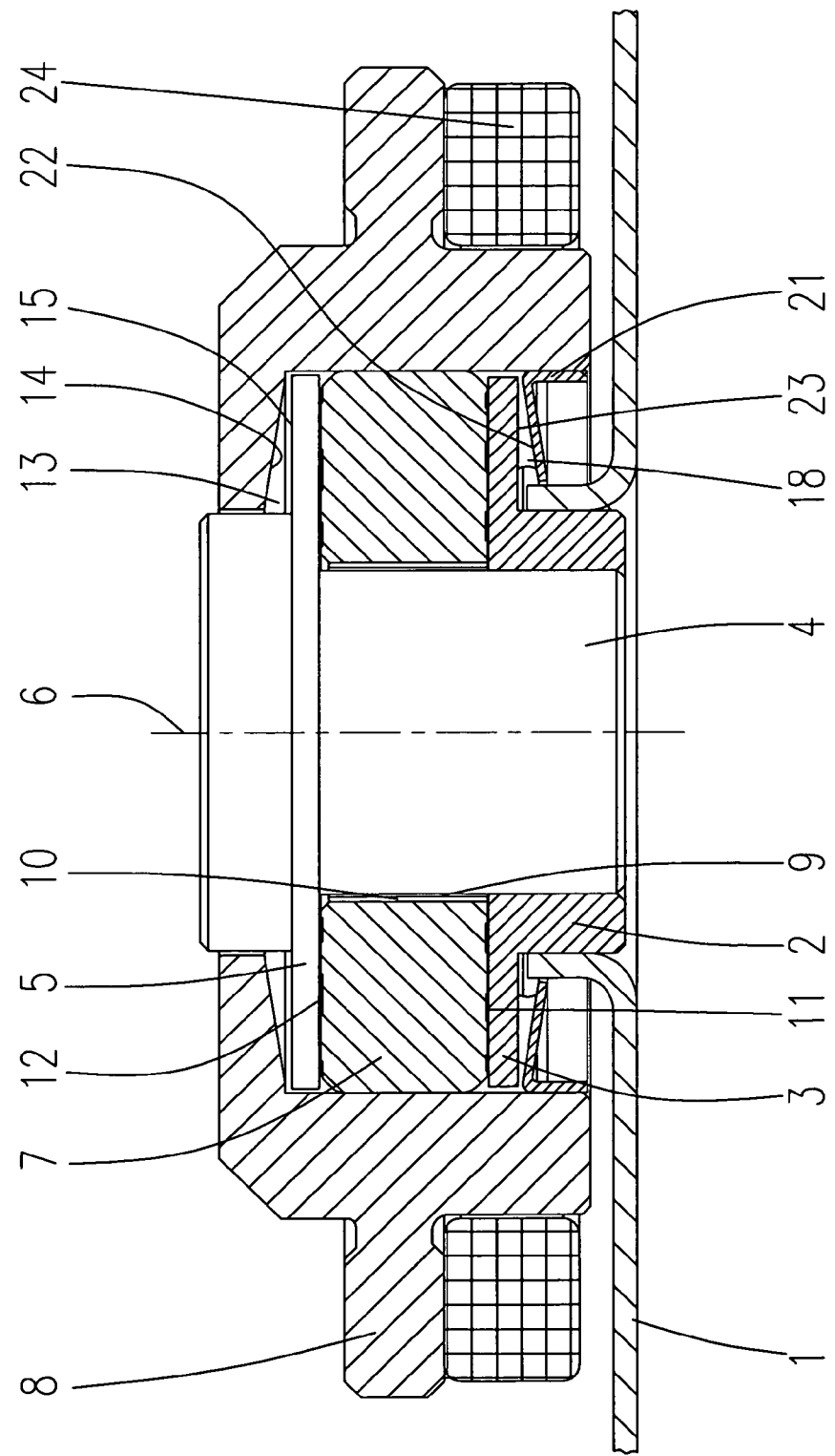
FIG. 2: a section through a second embodiment of a bearing system according to the invention.

FIG. 2 shows basically the same bearing arrangement as in FIG. 1. Reference is thus made to the description of the bearing system according to FIG. 1. Identical parts are indicated by the same reference numbers.

In contrast to FIG. 1, in the bearing arrangement according to FIG. 2, the rotationally symmetric component 21 of the second sealing arrangement takes the form of an approximately L-shaped deep-drawn metal sheet. One leg of the component 21 is fixedly connected to the lower inside edge of the rotor hub. The second leg of the component 21 is directed radially inwards and its end face 22 is disposed at an acute angle to the end face of the lower bearing disk 3 thus forming the reservoir 18.

Figure 3:
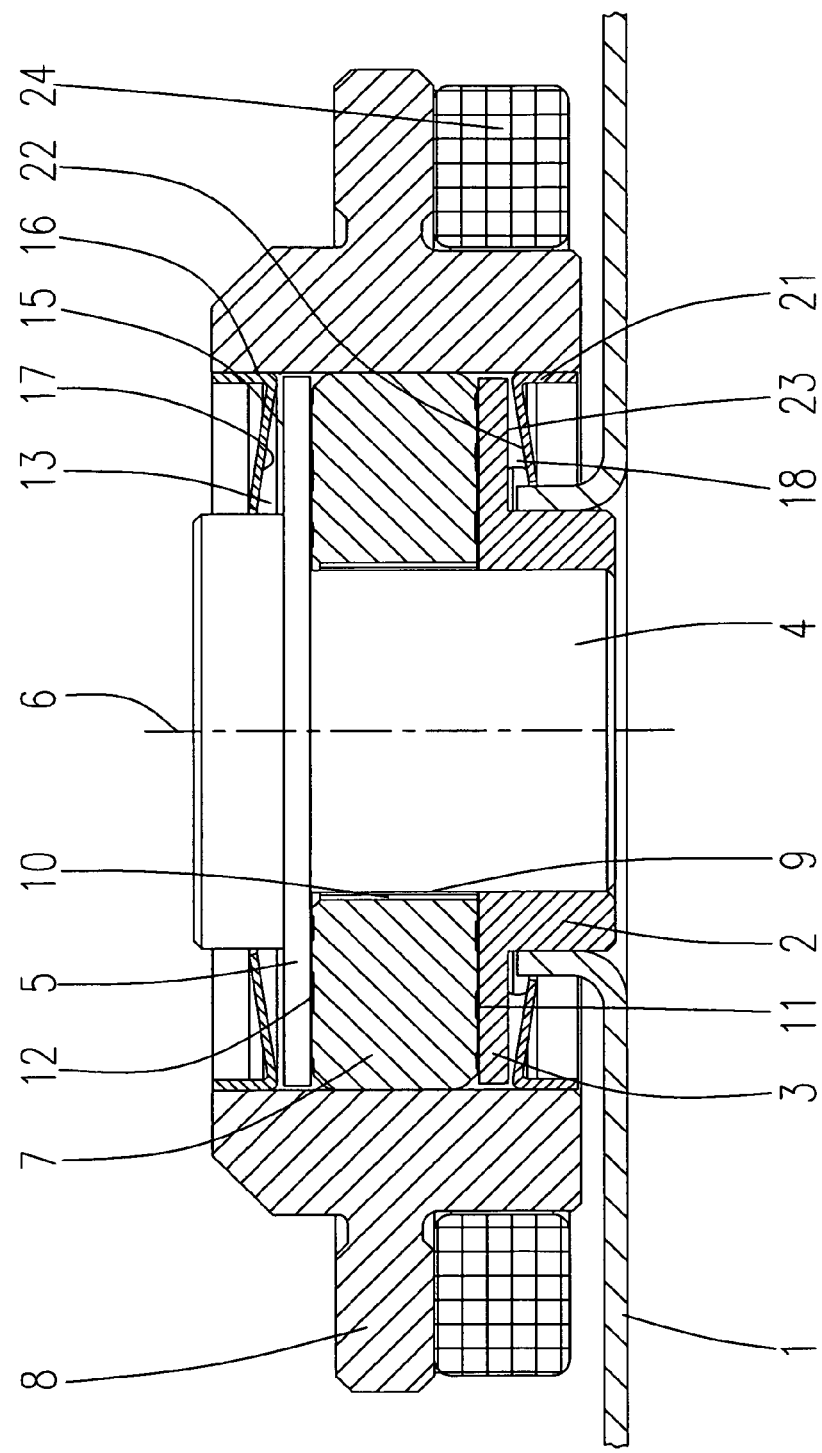
FIG. 3: a section through a third embodiment of a bearing system according to the invention.

FIG. 3 shows basically the same bearing arrangement as in FIG. 2. Reference is thus made to the description of the bearing system according to FIG. 1 or 2. Identical parts are indicated by the same reference numbers.

In contrast to FIGS. 1 and 2, in the bearing arrangement according to FIG. 3, the upper reservoir 13 is formed between a slanted inner end face 17 of a rotationally symmetric component 16 connected to the rotor hub and the end face of the second bearing disk 5, such that it tapers radially outwards narrowing in the direction of the bearing gap 9. The component 16 takes the form of an approximately L-shaped deep-drawn metal sheet. One leg of the component 21 is fixedly connected to the upper inside edge of the rotor hub 8. The second leg of the component 16 is directed radially inwards and its end face 17 is disposed at an acute angle to the end face of the upper bearing disk 5.

Figure 4:
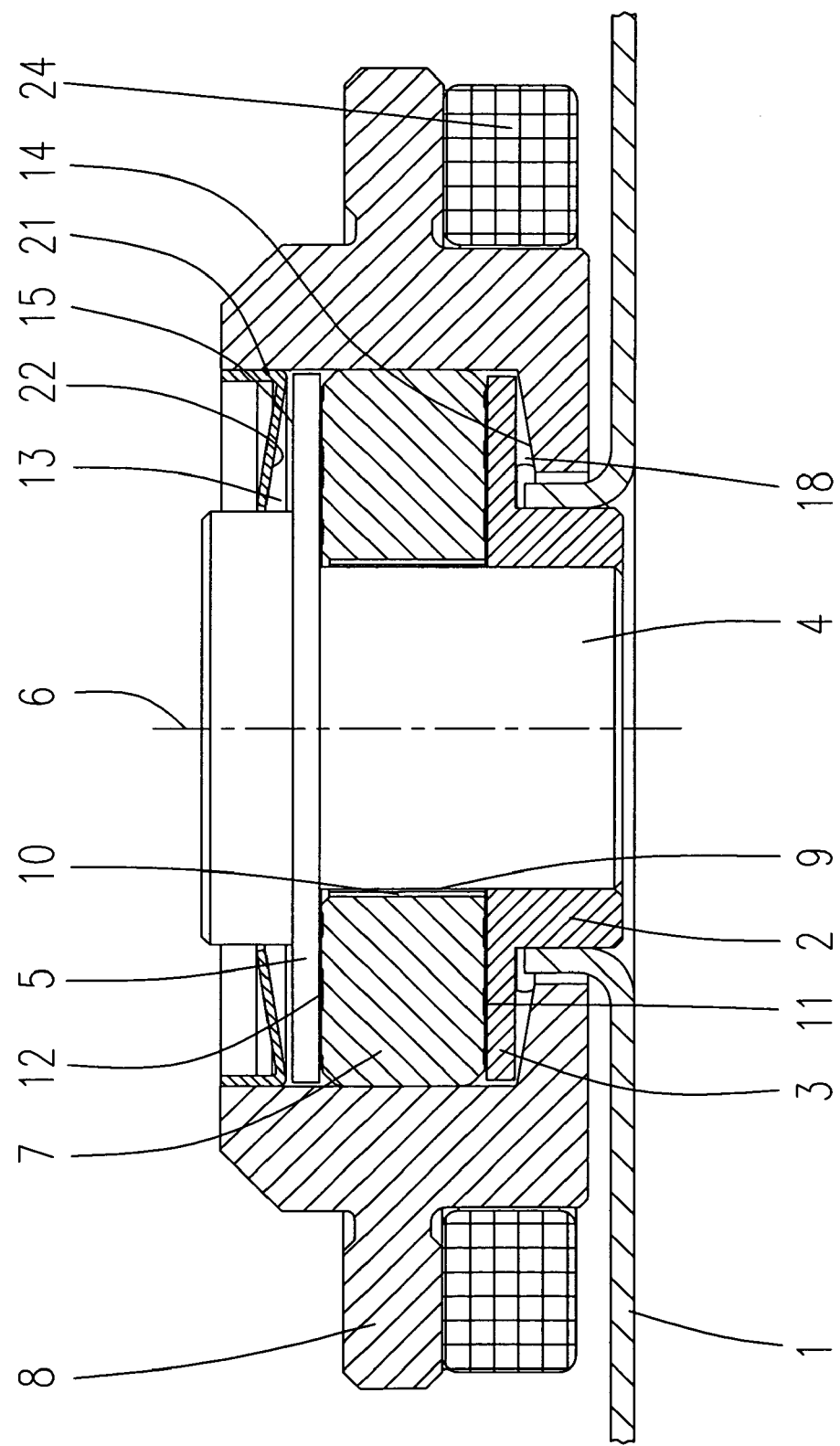
FIG. 4: a section through a fourth embodiment of a bearing system according to the invention.

FIG. 4 shows basically the same bearing arrangement as in FIG. 2. Reference is thus made to the description of the bearing system according to FIG. 1 or 2. Identical parts are indicated by the same reference numbers.

In contrast to FIG. 2, the lower reservoir 18 is formed between a slanted inner end face 14 of the rotor hub 8 and the end face 23 of the first bearing disk 3. The upper reservoir 13 is accordingly formed between a slanted inner end face 22 of a rotationally symmetric component 21 connected to the rotor hub and the end face 15 of the second bearing disk 5, such that both taper radially outwards narrowing in the direction of the bearing gap 9 defining a capillary seal and fluid reservoir 13. The component 21 has substantially an L-shaped cross section and is connected with its axial leg to the rotor hub 8.

Figure 5:
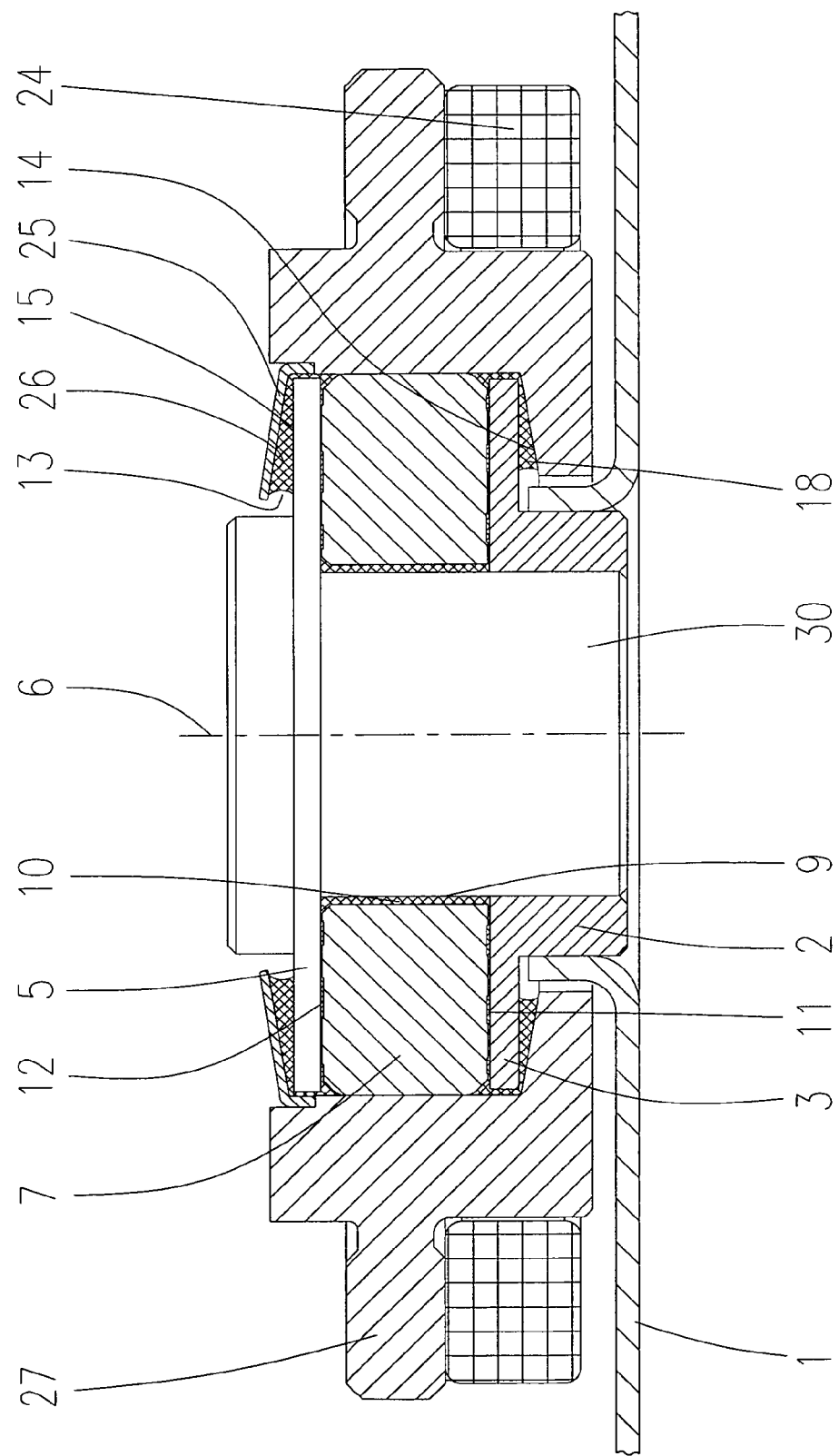
FIG. 5: a section through a fourth embodiment of a bearing system according to the invention.

FIG. 5 shows a modified embodiment of the bearing arrangement of FIG. 4. Reference is thus made to the description of the bearing system according to FIGS. 1 and 4. Identical parts are indicated by the same reference numbers.

Similar to the embodiment of FIG. 4, the upper reservoir 13 is formed between a slanted inner end face 26 of a radial leg of a rotationally symmetric component 25 connected to the rotor hub 27 and the end face 15 of the second bearing disk 5, such that both taper radially outwards narrowing in the direction of the bearing gap 9 defining a capillary seal and a fluid reservoir 13. The component substantially has an L-shaped cross section. To further reduce the overall axial height of the bearing system, the component 25 is fixed with its axial leg in an annual recess of-the rotor hub 27. In contrast to the embodiment of FIG. 4, the axial leg of the component 25 is directed towards the bearing gap 9.

Figure 6:
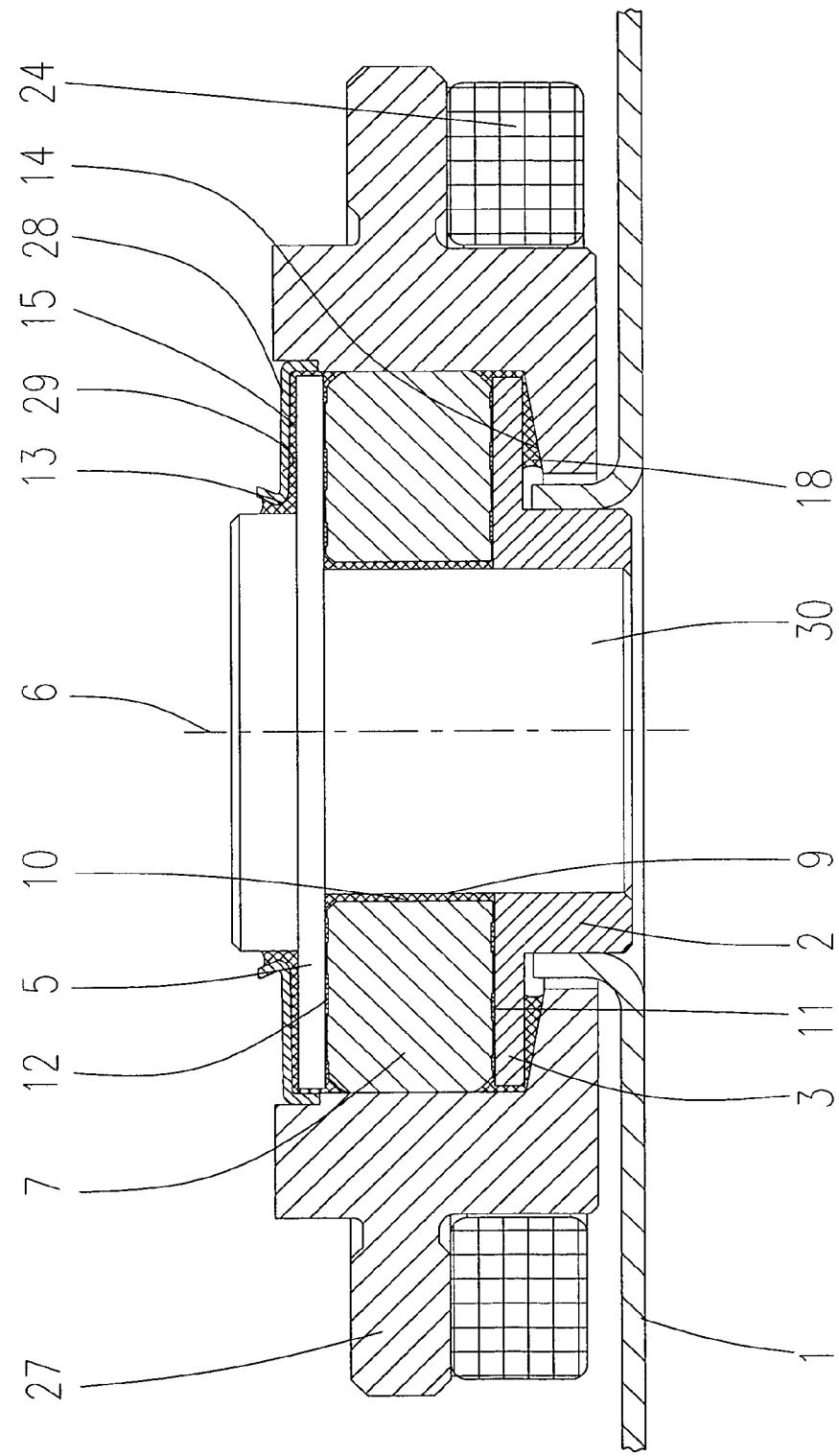
FIG. 6: a section through a fourth embodiment of a bearing system according to the invention.

FIG. 6 shows a modified embodiment of the bearing arrangement of FIG. 4. Reference is thus made to the description of the bearing system according to FIGS. 1 and 4. Identical parts are indicated by the same reference numbers.

Similar to the embodiment of FIG. 4, the upper reservoir 13 is formed between a inner end face 29 of a rotationally symmetric component 28 connected to the rotor hub and the end face 15 of the second bearing disk 5, such that both define a gap in extension of the bearing gap 9. The component 28 has a substantially Z-shaped cross section with a slanted inner axial leg, a radial center leg which defines the end face 29 and an outer axial leg. The slanted inner axial leg of the component 28 and an outer circumference of the second bearing disk 5 define a capillary seal narrowing in the direction of the sealing gap 9. To further reduce the overall axial height of the bearing system, the component 28 is fixed with its outer axial end in an annual recess of the rotor hub 30. In contrast to the embodiment of FIG. 4, the axial end of the component 28 is directed towards the bearing gap 9.

Figure 7:
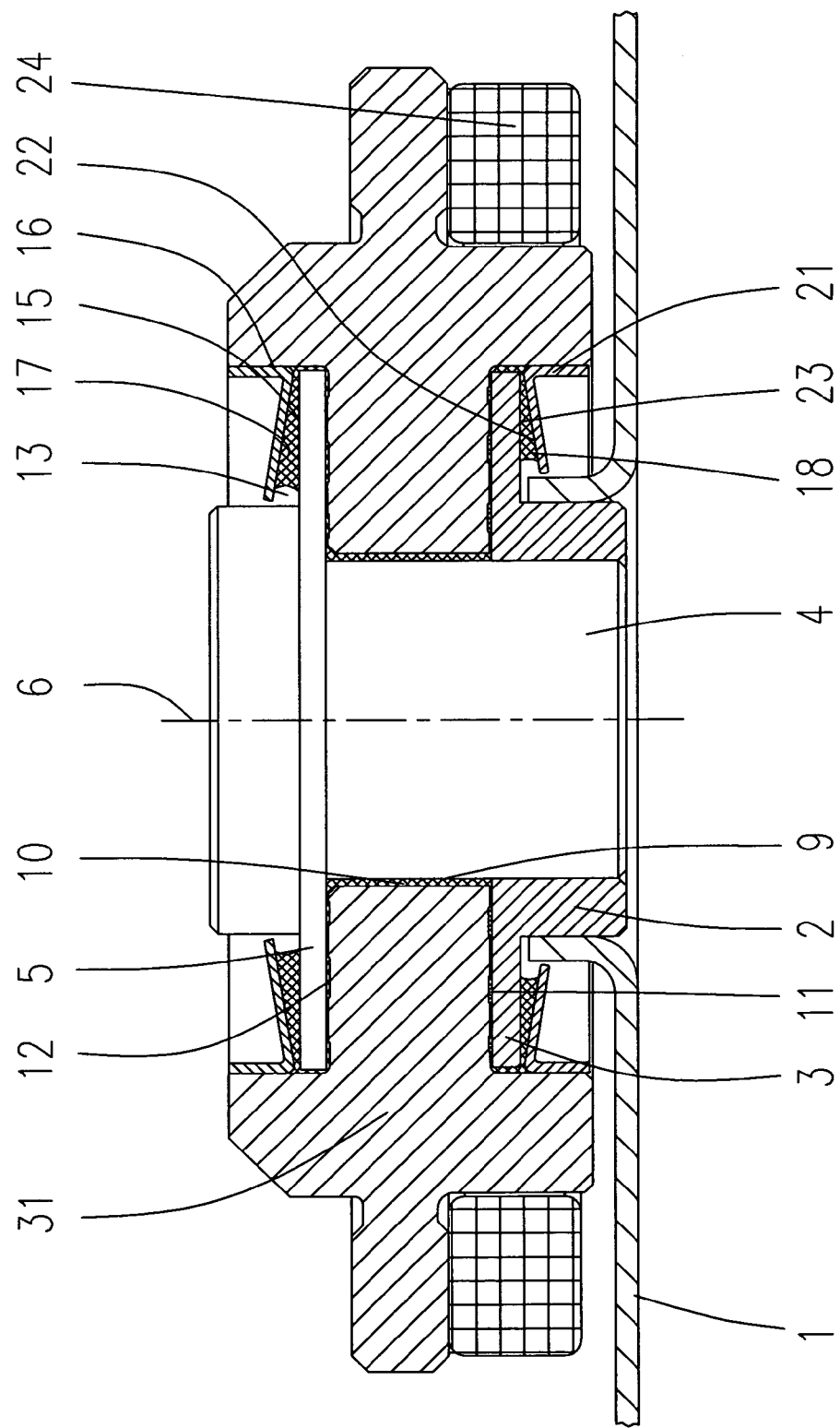
FIG. 7: a section through a fourth embodiment of a bearing system according to the invention.

FIG. 7 shows a modified embodiment of the bearing arrangement of FIG. 3. Reference is thus made to the description of the bearing system according to FIGS. 1 and 3. Identical parts are indicated by the same reference numbers.

In contrast to FIG. 3, the disk-shaped component (indicated with reference numeral 7 in FIG. 3) and the rotor hub (indicated with reference numeral 8 in FIG. 3) build up a monolithic rotor component 31.

Figure 8:
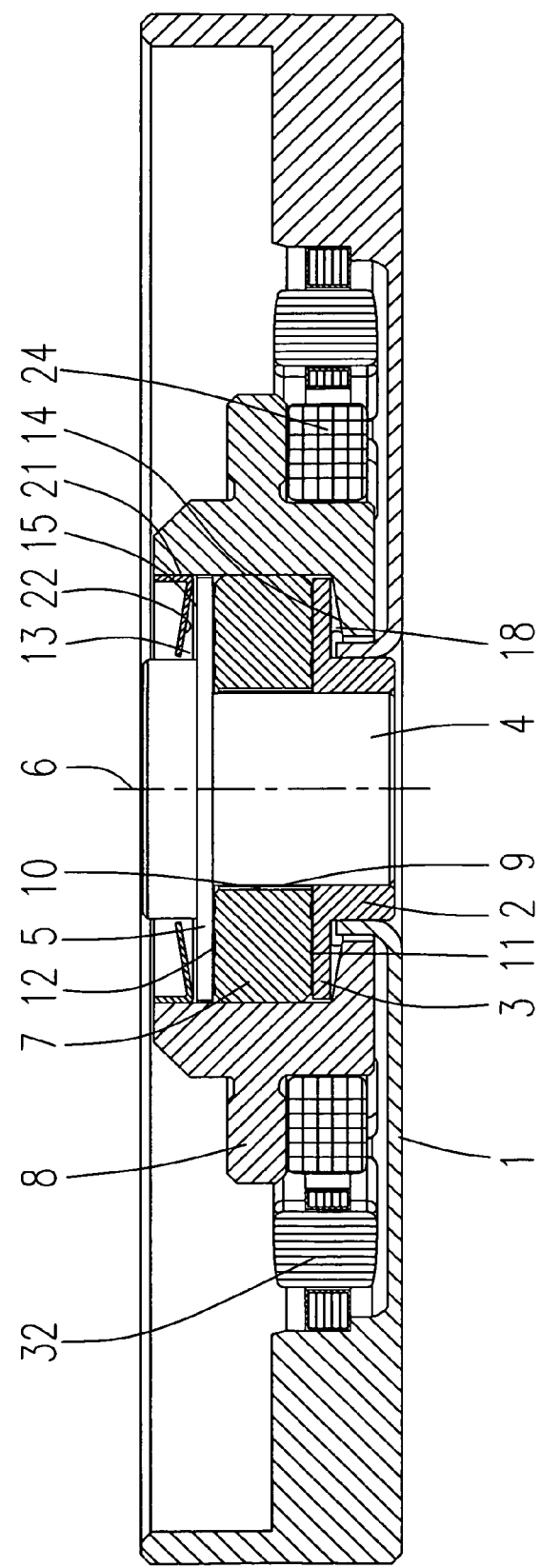
FIG. 8: a section through a spindle motor with a bearing system according to FIG. 4.

FIG. 8 shows a cross-section of a spindle motor with a bearing system according to FIG. 4. Reference is thus made to the description of the bearing system according to FIG. 1 or 4. Identical parts are indicated by the same reference numbers.

The base 1 forms a housing for receiving the components of the spindle motor. The base 1 comprises on an inner circumference a stator arrangement 32 which is arranged next to and radially outwards of the permanent magnet 24 connected to the rotor hub 8. The stator arrangement 32, in a known art, sets up an alternating electrical field at the permanent magnet 24 and consequently sets the rotor hub 8 in rotation. The spindle motor may be part of a hard disk drive where at least one storage disk (not shown) may be arranged on the rotor hub 8.

IDENTIFICATION REFERENCE LIST

1 Base
2 Sleeve
3 Bearing disk (first)
4 Shaft
5 Bearing disk (second)
6 Rotational axis
7 Annular disk-shaped component
8 Rotor hub
9 Bearing gap
10 Radial bearing
11 Axial bearing
12 Axial bearing
13 Reservoir
14 End face (rotor hub 8)
15 End face (bearing disk 5)
16 Component
17 End face (component 16)
18 Reservoir
19 Component
20 End face (component 19)
21 Component
22 End face (component 21)
23 End face (bearing disk 3)
24 Permanent magnet
25 Component
26 End face (component 25)
27 Rotor hub
28 Component
29 End face (component 28)
30 Rotor hub
31 Rotor component
32 Stator arrangement

The invention claimed is:

1. A fluid dynamic bearing system, with an overall axial height considerably smaller than the fluid dynamic bearing system's radial extension, comprising:

a stationary bearing construction having:
 a sleeve (2) disposed in a base (1) and a first bearing disk (3) disposed on one side of the sleeve, the sleeve (2) and the first bearing disk (3) forming an annular recess, wherein the recess houses a radial inwards projecting part of the rotor hub (8) or a component (21) connected to the rotor hub (8) in order to form a capillary seal and reservoir (18), a shaft (4) firmly fixed at one end in the sleeve and a second bearing disk (5) disposed at the other end of the shaft, the second bearing disk being an integral part of the shaft and being disposed on the shaft at a spacing to the first bearing disk such that an annular space is formed between the two bearing disks (3; 5), the shaft (4) and the second bearing disk (5) forming an annular recess, wherein the recess houses a radial inwards projecting part of the rotor hub (8) or a component (16; 21; 25) connected to the rotor hub (8) in order to form a capillary seal and reservoir (13);

a bearing construction rotating about a rotational axis (6) having:

a rotor component comprising an annular disk-shaped component (7) that is disposed in the annular disk-shaped space formed by the stationary bearing construction, and a rotor hub (8) disposed at the outer circumference of the annular disk-shaped component (7), a bearing gap (9) filled with a bearing fluid and formed by the bearing surfaces opposing each other of the stationary and the rotating bearing construction, at least one radial bearing (10) formed between the outer circumference of the shaft (4) and the inner circumference of the annular disk-shaped component (7), at least two axial bearings (11; 12) formed by the two end faces of the annular disk-shaped component (7) and the first end faces of the bearing disks (3; 5) opposing these; and capillary seals to seal the two open ends of the bearing gap (9), at least one capillary seal comprising a reservoir (13; 18) that is at least partly filled with bearing fluid and is formed between the surfaces opposing each other of the rotor hub (8), or a component (16; 19; 21; 25; 28) connected to the rotor hub, and an end face of one of the bearing disks (3; 5), such capillary seal comprising a reservoir (13; 18) extending substantially perpendicular to the rotational axis (6) and tapering radially outwards narrowing in the direction of the bearing gap (9), and such reservoir having no substantial axial tapering.

2. A fluid dynamic bearing system according to claim 1, characterized in that the first bearing disk (3) and the sleeve (2), as well as the second bearing disk (5) and the shaft (4) form annular recesses at the outer circumference of the sleeve and the shaft, respectively, which accommodate the capillary seals and the reservoirs (13; 18).

3. A fluid dynamic bearing system according to claim 1, characterized in that a first capillary seal is provided that has an annular reservoir (13) substantially perpendicular to the rotational axis which is formed between a slanted inner end face (14) of the rotor hub (8) and the end face (15) of the second bearing disk (5) such that the reservoir tapers radially outwards narrowing in the direction of the bearing gap (9).

4. A fluid dynamic bearing system according to claim 1, characterized in that a first capillary seal is provided that has an annular reservoir (13) substantially perpendicular to the rotational axis which is formed between a slanted inner end face (17) of a rotationally symmetric component (16; 25; 28) connected to the rotor hub and an end face of the second bearing disk (5) such that the reservoir tapers radially outwards narrowing in the direction of the bearing gap (9).

5. A fluid dynamic bearing system according to claim 4, characterized in that the component (16; 25; 28) is a turned part.

6. A fluid dynamic bearing system according to claim 4, characterized in that the component (16; 25; 28) is a deep-drawn part.

7. A fluid dynamic bearing system according to claim 1, characterized in that a second capillary seal is provided that has an annular reservoir (18) perpendicular to the rotational axis which is formed between a slanted inner end face (20; 22) of a rotationally symmetric component (19; 21) connected to the rotor hub and an end face (23) of the first bearing disk (3) such that the reservoir tapers radially outwards narrowing in the direction of the bearing gap (9).

8. A fluid dynamic bearing system according to claim 7, characterized in that the component (19; 21) is a turned part.

9. A fluid dynamic bearing system according to claim 7, characterized in that the component (19; 21) is a deep-drawn part.

10. A fluid dynamic bearing system according to claim 1, characterized in that it is a component of a spindle motor.

11. A fluid dynamic bearing system according to claim 1, characterized in that it is a component of a hard disk drive.

12. A fluid dynamic bearing system comprising:

a stationary bearing construction having:

a sleeve (2) disposed in a base (1) and a first bearing disk (3) disposed on one side of the sleeve, a shaft (4) firmly fixed at one end in the sleeve and a second bearing disk (5) disposed at the other end of the shaft, the second bearing disk being disposed on the shaft at a spacing to the first bearing disk such that an annular space is formed between the two bearing disks (3; 5);

a bearing construction rotating about a rotational axis (6) having:

a rotor component comprising an annular disk-shaped component (7) that is disposed in the annular disk-shaped space formed by the stationary bearing construction, and a rotor hub (8) disposed at the outer circumference of the annular disk-shaped component (7), a bearing gap (9) filled with a bearing fluid and formed by the bearing surfaces opposing each other of the stationary and the rotating bearing construction, at least one radial bearing (10) formed between the outer circumference of the shaft (4) and the inner circumference of the annular disk-shaped component (7), at least two axial bearings (11; 12) formed by the two end faces of the annular disk-shaped component (7) and the first end faces of the bearing disks (3; 5) opposing these; and capillary seals to seal the two open ends of the bearing gap (9), at least one capillary seal comprising a reservoir (13; 18) that is at least partly filled with bearing fluid and is formed between the surfaces opposing each other of the rotor hub (8), or a component (16; 19; 21; 25; 28) connected to the rotor hub, and an end face of one of the bearing disks (3; 5), such reservoir (13; 18) extending substantially perpendicular to the rotational axis (6) and tapering radially outwards narrowing in the direction of the bearing gap (9), and such reservoir having no substantial axial tapering.

* * * * *